(12) United States Patent
Hsieh

(10) Patent No.: US 8,762,714 B2
(45) Date of Patent: Jun. 24, 2014

(54) PROTECTING AGAINST COUNTERFEIT ELECTRONICS DEVICES

(75) Inventor: John Hsieh, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 1256 days.

(21) Appl. No.: 11/739,539

(22) Filed: Apr. 24, 2007

(65) Prior Publication Data

US 2008/0267408 A1    Oct. 30, 2008

(51) Int. Cl.
| | |
|---|---|
| *H04L 9/32* | (2006.01) |
| *G06F 21/44* | (2013.01) |
| *H04L 29/06* | (2006.01) |
| *G06F 1/26* | (2006.01) |
| *G06F 11/00* | (2006.01) |
| *G08B 13/00* | (2006.01) |
| *H04K 1/00* | (2006.01) |
| *G06F 21/70* | (2013.01) |

(52) U.S. Cl.
CPC .............. *G06F 21/44* (2013.01); *G06F 21/445* (2013.01); *H04L 63/12* (2013.01); *G06F 21/70* (2013.01)
USPC .............................. 713/168; 726/34; 380/256

(58) Field of Classification Search
CPC ....... H04L 63/12; H04L 63/123; G06F 21/44; G06F 21/445; G06F 21/70
USPC ........... 713/168; 380/256, 259; 710/8–19, 22, 710/23, 26, 28; 711/154, 155, 163, 164; 726/34
See application file for complete search history.

(56) References Cited

U.S. PATENT DOCUMENTS

| | | | |
|---|---|---|---|
| 4,799,061 | A | 1/1989 | Abraham et al. |
| 4,896,319 | A | 1/1990 | Lidinsky et al. |
| 4,905,301 | A | 2/1990 | Krolopp et al. |
| 5,122,893 | A | 6/1992 | Tolbert |
| 5,386,468 | A | 1/1995 | Akiyama et al. |
| 5,909,491 | A | 6/1999 | Luo |
| 6,028,937 | A | 2/2000 | Tatebayashi et al. |
| 6,052,604 | A | 4/2000 | Bishop et al. |

(Continued)

FOREIGN PATENT DOCUMENTS

EP    898397 A2    2/1999

OTHER PUBLICATIONS 200410095201.0, Mail Date Apr. 11, 2008, Office Action (China).
04090443.5, Mail Date Mar. 20, 2006, Office Action (EPO).

(Continued)

*Primary Examiner* — Evans Descrosiers
*Assistant Examiner* — Daniel Potratz
(74) *Attorney, Agent, or Firm* — Maschoff Brennan

(57) ABSTRACT

An optical transceiver module is authenticated in a host system. A host generates a data string and writes the data string to a first predetermined memory location known to the transceiver. The data string is cryptographically altered (either encrypted or decrypted) by the transceiver and written to a second predetermined memory location known to the host. The host retrieves the cryptographically altered data string and performs a complementary cryptographic operation (either a decryption or encryption, respectively) thereon, creating a resulting data string. If the resulting data string is equal to the data string written to the first predetermined memory location, the transceiver is authenticated. The host and the transceiver may switch roles, with the transceiver generating the data string, the host cryptographically altering it, and so on. The host encrypts data strings when the transceiver decrypts data strings, and vice versa.

13 Claims, 5 Drawing Sheets

(56) References Cited

U.S. PATENT DOCUMENTS

| | | | |
|---|---|---|---|
| 6,058,476 A * | 5/2000 | Matsuzaki et al. | 713/169 |
| 6,128,389 A | 10/2000 | Chan et al. | |
| 6,223,042 B1 | 4/2001 | Raffel | |
| 6,240,517 B1 * | 5/2001 | Nishioka | 726/20 |
| 6,253,322 B1 | 6/2001 | Susaki et al. | |
| 6,362,869 B1 | 3/2002 | Silverbrook | |
| 6,370,249 B1 | 4/2002 | Van Oorschot | |
| 6,371,354 B2 | 4/2002 | Blohmann et al. | |
| 6,374,354 B1 | 4/2002 | Walmsley et al. | |
| 6,442,525 B1 | 8/2002 | Silverbrook et al. | |
| 6,493,825 B1 * | 12/2002 | Blumenau et al. | 713/168 |
| 6,760,752 B1 | 7/2004 | Liu et al. | |
| 6,938,166 B1 | 8/2005 | Sarfati et al. | |
| 7,042,406 B2 | 5/2006 | McFarland et al. | |
| 7,149,430 B2 | 12/2006 | Hosking et al. | |
| 7,197,298 B2 | 3/2007 | Azuma | |
| 7,356,357 B2 | 4/2008 | DeCost et al. | |
| 7,450,719 B2 | 11/2008 | Lee et al. | |
| 7,580,988 B2 | 8/2009 | Rudd | |
| 7,657,740 B2 | 2/2010 | Numao et al. | |
| 7,697,691 B2 | 4/2010 | Sutton et al. | |
| 7,724,907 B2 | 5/2010 | Candelore | |
| 7,747,541 B2 | 6/2010 | Walmsley et al. | |
| 7,823,214 B2 * | 10/2010 | Rubinstein et al. | 726/34 |
| 7,845,016 B2 * | 11/2010 | Diab et al. | 726/34 |
| 2001/0037467 A1 | 11/2001 | O'Toole et al. | |
| 2001/0052850 A1 | 12/2001 | Zimmerman | |
| 2002/0018458 A1 | 2/2002 | Aiello et al. | |
| 2002/0136169 A1 | 9/2002 | Struhsaker et al. | |
| 2002/0137472 A1 | 9/2002 | Quinn et al. | |
| 2002/0164026 A1 | 11/2002 | Huima | |
| 2002/0170960 A1 | 11/2002 | Ehrensvard et al. | |
| 2003/0021418 A1 | 1/2003 | Arakawa et al. | |
| 2003/0072059 A1 | 4/2003 | Thomas et al. | |
| 2003/0108199 A1 | 6/2003 | Pinder et al. | |
| 2003/0113118 A1 | 6/2003 | Bartur | |
| 2003/0128411 A1 | 7/2003 | Aronson et al. | |
| 2003/0154355 A1 * | 8/2003 | Fernandez | 711/163 |
| 2003/0159036 A1 | 8/2003 | Walmsley et al. | |
| 2003/0172268 A1 | 9/2003 | Walmsley et al. | |
| 2003/0188175 A1 | 10/2003 | Volk et al. | |
| 2004/0052377 A1 | 3/2004 | Mattox et al. | |
| 2004/0064699 A1 | 4/2004 | Hooker et al. | |
| 2004/0081079 A1 | 4/2004 | Forest et al. | |
| 2004/0177369 A1 | 9/2004 | Akins, III | |
| 2004/0249817 A1 | 12/2004 | Liu et al. | |
| 2005/0001589 A1 * | 1/2005 | Edington et al. | 320/128 |
| 2005/0085193 A1 | 4/2005 | Stromberg et al. | |
| 2005/0113068 A1 | 5/2005 | Hoffmann | |
| 2005/0113069 A1 * | 5/2005 | Knauerhase et al. | 455/411 |
| 2005/0203582 A1 * | 9/2005 | Healy et al. | 607/31 |
| 2006/0117181 A1 | 6/2006 | Brickell | |
| 2006/0232376 A1 | 10/2006 | Blaker | |
| 2007/0083491 A1 | 4/2007 | Walmsley et al. | |
| 2007/0092258 A1 | 4/2007 | Nelson | |
| 2007/0130254 A1 | 6/2007 | Russ et al. | |
| 2007/0177879 A1 | 8/2007 | Hsieh | |
| 2007/0192599 A1 * | 8/2007 | Kato et al. | 713/168 |
| 2008/0267408 A1 | 10/2008 | Hsieh | |
| 2009/0100502 A1 | 4/2009 | Li | |
| 2009/0240945 A1 | 9/2009 | Aronson | |
| 2010/0005301 A1 | 1/2010 | Asano et al. | |

OTHER PUBLICATIONS 04 09 0443, Mail Date Apr. 6, 2005, European Search Report.
Menezes et al., *Handbook of Applied Cryptography,* 1997, pp. 397, 398, 403-405, 548, 549, 559, 560 (9 pages).
U.S. Appl. No. 10/718,753, Mail Date Sep. 23, 2010, Office Action.
U.S. Appl. No. 10/718,753, Mail Date May 25, 2010, Office Action.
U.S. Appl. No. 10/718,753, Mail Date Nov. 20, 2009, Office Action.
U.S. Appl. No. 10/718,753, Mail Date Mar. 31, 2009, Office Action.
U.S. Appl. No. 10/718,753, Mail Date Aug. 26, 2008, Office Action.
U.S. Appl. No. 10/718,753, Mail Date Apr. 10, 2008, Office Action.
Menezes, et al., Handbook of Applied Cryptography, Chapter 1, CRC Press, 1996 (48 pages).
U.S. Appl. No. 12/251,139, Mail Date Mar. 9, 2011, Office Action.
U.S. Appl. No. 12/264,194, Mail Date Sep. 28, 2010, Office Action.
U.S. Appl. No. 12/251,139, Mail Date Sep. 6, 2011, Office Action.
U.S. Appl. No. 10/718,753, Mail Date Aug. 30, 2011, Office Action.
U.S. Appl. No. 10/718,753, Mail Date Mar. 17, 2011, Office Action.
U.S. Appl. No. 12/264,194, Mail Date Apr. 27, 2011, Office Action.
U.S. Appl. No. 10/718,753, Mail Date Dec. 21, 2011, Notice of Allowance.
U.S. Appl. No. 12/264,194, Mail Date Feb. 2, 2012, Office Action.

\* cited by examiner

PROTECTING AGAINST COUNTERFEIT ELECTRONICS DEVICES

CROSS-REFERENCE TO RELATED APPLICATIONS

Not applicable.

BACKGROUND OF THE INVENTION

1. The Field of the Invention

The present invention generally relates to optical transceiver modules. More particularly, the present invention relates to a device and methods for validating the authenticity of an optical transceiver module via a predetermined cryptographic scheme.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission in such networks is implemented by way of an optical transmitter (also referred to as an "optoelectronic transducer"), such as a laser or Light Emitting Diode ("LED"). The optoelectronic transducer emits light when current is passed through it, the intensity of the emitted light being a function of the magnitude of the current. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to as the "controller") controls the operation of the laser driver and post-amplifier.

One challenge that is increasingly encountered involves the authenticity of optical transceivers used in connection with optical networking devices. For instance, manufacturers and users of optical networking devices that employ optical transceivers—such as routers, switches, and the like—often desire that only authentic transceivers originating from a reliable manufacturer be used in their devices.

Unfortunately, knock-off transceivers of unknown or spurious origin can infiltrate the transceiver market such that they are employed in optical networking devices. Such optical transceivers can be of inferior quality or be configured contrary to what is needed or desired. As a result, operation of the optical networking device itself can be compromised.

In light of the above, a need exists in the art for a means by which the identity of optical transceivers and other communications modules can be authenticated so as to prevent unknown or counterfeit devices from being employed in critical optical networking applications.

BRIEF SUMMARY OF THE INVENTION

Embodiments of the present invention are directed to a device and methods for component authentication. In particular, embodiments of the invention enable a communications module, such as an optical transceiver module, to be authenticated in a host system. This allows the host system to validate the transceiver as an authentic device from an identified source, such as a particular vendor, thereby allowing other, invalidated transceivers to be identified.

A transceiver manufacturer ("manufacturer") and a host system manufacturer ("value added reseller" or "VAR") agree on an encryption scheme and a first and second predetermined memory location either in the transceiver or in the host system. The host system and the transceiver are programmed with complementary cryptographic keys. In one embodiment, the transceiver is programmed with the encryption key and the host system is programmed with the complementary decryption key. In other words, whatever is encrypted by the transceiver may be decrypted by the host system.

When authenticating the transceiver, the host system generates a first random or pseudo-random data string and writes it to a first predetermined memory location known to the transceiver. The transceiver detects when the first data string is written to the first predetermined memory location, encrypts the first data string using the encryption key and writes an encrypted data string to a second predetermined memory location known to the host system. The host system retrieves the encrypted data string and, using the complementary decryption key, decrypts the encrypted data string. By comparing the decrypted data string to the first data string, the host system can verify that the transceiver is a valid transceiver for use with the host. If the decrypted data string is not equal to the first data string, or if the transceiver does not write any data string at all to the second predetermined memory location, this can indicate a problem condition existing with an otherwise valid transceiver, or the presence of a non-authenticated (invalid) transceiver. In either case, corrective or appropriate action can be taken by the host, including deactivation of the transceiver, the sending of an alert, etc.

According to other embodiments of the invention, the host system may perform encryption of the data string while the transceiver performs decryption of the data string. Alternately, the host system and the transceiver may switch roles, with the transceiver generating the first data string, the host encrypting or decrypting the data string, and so on. Additionally, the present invention may be implemented between a host system and other components communicably connected to the host system, not just between a host system and a transceiver.

According to another embodiment of the invention, the host system and transceiver are programmed with identical encryption keys. The host generates a random or pseudo-random data string and provides it to the transceiver. The transceiver receives and encrypts the data string using its encryption key and thereby generates a transceiver-encrypted data string, which it provides to the host. The host encrypts a duplicate version of the data string using its encryption key and thereby generates a host-encrypted data string. The host compares the transceiver-encrypted data string with the host-encrypted data string. If the encrypted data strings are identical, the transceiver is authenticated and identified as an authorized transceiver. If the encrypted data strings are not identical, the host can take corrective action.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

FIGS. 1, 2 and 4-6 depict various features of embodiments of the present invention, which is generally directed to an optical transceiver module ("transceiver") or other device having the ability to authenticate itself to a host system to which the transceiver module or device is attached. This allows the host system to validate the transceiver as an authentic transceiver from an identified source, such as a particular vendor, thereby allowing other, invalidated transceivers to be identified. While the invention will be discussed in the context of transceiver or optoelectronic device authentication, those of skill in the art will recognize that the principles of the present invention may be implemented in the authentication of other electronics devices having the functionality described below. Furthermore, the invention can be implemented between two devices through a memory-mapped device interface or a command-based device interface.

Figure 1:
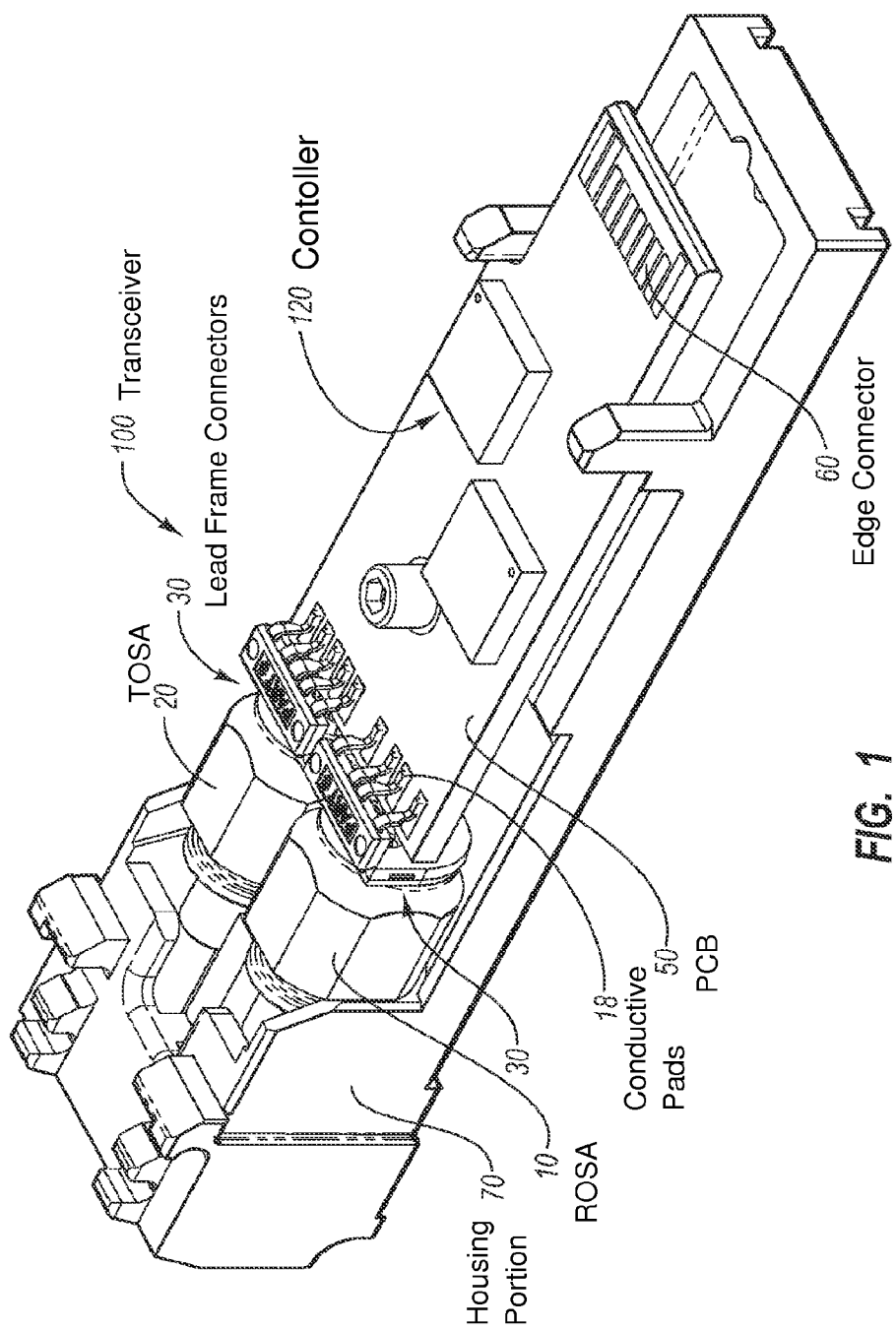
FIG. 1 is a perspective view of an optical transceiver module including various components that are employed in connection with one exemplary embodiment of the present invention.

The present invention can be implemented in various optoelectronic devices. As used herein, the term "optoelectronic device" includes devices having both optical and electrical components. Examples of optoelectronic devices include, but are not limited to transponders, transceivers, transmitters, and/or receivers. FIG. 1 illustrates an exemplary optical transceiver 100 in which the principles of the present invention may be employed. The optical transceiver 100 can be authenticated at any time after being plugged in to the host. While the optical transceiver 100 will be described in some detail, the optical transceiver 100 is described by way of illustration only, and not by way of restricting the scope of the invention.

As depicted, the transceiver shown in FIG. 1 includes various components, including a receiver optical subassembly ("ROSA") 10, a transmitter optical subassembly ("TOSA") 20, lead frame connectors 30, an integrated circuit controller 120, and a printed circuit board 50. In detail, two lead frame connectors 30 are included in the transceiver 100, one each used to electrically connect the ROSA 10 and the TOSA 20 to a plurality of conductive pads 18 located on the PCB 50. The controller 120 is also operably attached to the PCB 50. An edge connector 60 is located on an end of the PCB 50 to enable the transceiver 100 to electrically interface with a host (not shown here). As such, the PCB 50 facilitates electrical communication between the ROSA 10, TOSA 20 and the host. In addition, the above-mentioned components of the transceiver 100 are partially housed within a housing portion 70. Though not shown, a shell can cooperate with the housing portion 70 to define a covering for the components of the transceiver 100.

As illustrated in FIG. 1, PCB 50 includes circuitry and electronic components for use with the TOSA 20 and ROSA 10 in performing the optical signal transmission and reception activities of the transceiver 100. Among the components of the PCB 50 are a laser driver, a post amplifier, a controller, and persistent memory. It will be appreciated that one or more of these components can be integrated on a single chip, or can be separately disposed on the PCB 50. In one exemplary embodiment, the transceiver 100 uses the controller 120 to authenticate itself to the host system. In particular, the controller cooperates in one embodiment with the host to encrypt a random or pseudo-random data string (or other data string), return the encrypted data string to the host and thereby authenticate itself to the host system.

Figure 2:
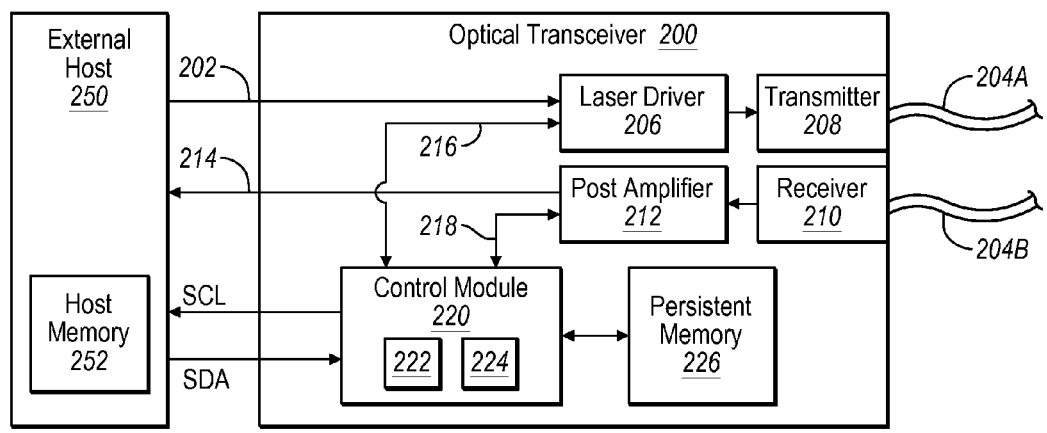
FIG. 2 schematically illustrates an exemplary optical transceiver that may implement features of the present invention.

Reference is now made to FIG. 2, which illustrates various features of the present invention, according to one embodiment. As mentioned, embodiments of the present invention are directed to a transceiver or other component configured to enable its authentication to a host system to which it is operably attached, and a method for such authentication to be performed. In detail, FIG. 2 shows a simplified block diagram of an exemplary optoelectronic device, implemented here as a transceiver 200.

During operation, the transceiver 200 can receive a data-carrying electrical signal 202 from the host 250, which can be any computing system capable of communication with the optical transceiver 200, for transmission as a data-carrying optical signal on to an optical fiber 204A using a transmitter 208, which corresponds to the TOSA 20 of FIG. 1. In addition, the transceiver 200 is configured to receive a data-carrying optical signal from an optical fiber 204B using an optical receiver 210, which corresponds to the ROSA 10 of FIG. 1. Whereas the use of transceivers to transmit and receive data-carrying electrical and/or optical signals is well-known in the art, it will not be described in greater detail to avoid unnecessarily obscuring the invention.

In one embodiment, the transceiver 200 includes a controller 220, which can be used for, among other things, optimizing the performance of the transceiver 200. The controller 220 may include one or more general purpose processors 222 and internal controller memory 224. The one or more processors 222 recognize instructions that follow a particular instruction set, and may perform normal general-purpose operations such as shifting, branching, adding, subtracting, multiplying, dividing, Boolean operations, comparison operations, and the like. In one embodiment, the processor 222 is a 16-bit processor. The internal controller memory 224 may be Random Access Memory (RAM) or nonvolatile memory. While system memory 224 may be RAM, it may also be a processor, register, flip-flop or other memory device.

The controller 220 may have access to persistent memory 226 (not to be confused with internal controller memory 224), which in one embodiment, is Electrically Erasable Programmable Read-Only Memory (EEPROM). Persistent memory 226 may also be any other nonvolatile memory source. The persistent memory 226 and the control module 220 may be packaged together in the same package or in different packages without restriction.

In the present embodiment, $I^2C$ is implemented as a data interface protocol between the host 250 and the controller 220 and data and clock signals may be provided from the host 250 using the serial clock line SCL and the serial data line SDA. However, the principles of the present invention may also be implemented in systems which utilize MDIO, 1-wire, or any other data interface protocol between the host 250 and the controller 220.

Figure 3:
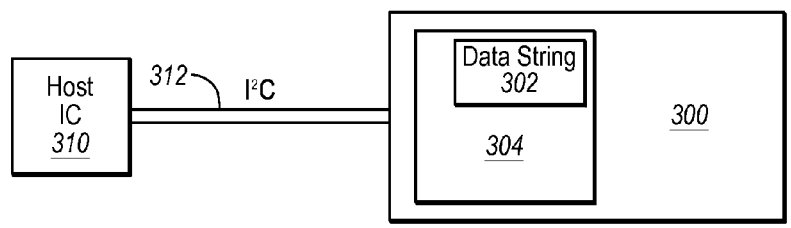
FIG. 3 depicts a device and method for authentication of a device by a host system.

In accordance with one embodiment of the present invention, the transceiver 200 is configured to provide authentication for use by a host to which the transceiver is operably connected. To more fully understand the advantages of the present invention over the prior art, a conventional authentication technique of a transceiver will be explained briefly with respect to FIG. 3. The technique of FIG. 3 is often implemented between a transceiver manufacturer and a value added reseller (VAR). The VAR manufactures, assembles, or otherwise provides the host systems within which the manufacturer's transceivers are integrated.

In order to prevent counterfeit transceivers from being used in the host system, the VAR and the manufacturer agree upon a predetermined data string to include in a predetermined memory location 302 on the transceiver 300 or other component. As illustrated in FIG. 3, this data is often stored in persistent memory 304 such as EEPROM or other nonvolatile memory. When the transceiver is plugged into or otherwise connected to the host, a host IC 310 is programmed to look for the data string in the predetermined memory location 302. This data string may be thought of as the manufacturer's signature, identifying the transceiver as being a genuine component made by the manufacturer. If the host IC 310 finds the data string at the predetermined location 302 on the transceiver, the host IC 310 accepts the transceiver as a genuine part from the manufacturer and provides power to the port at which the transceiver is located. If the data string is not found at the predetermined location on the transceiver, the host rejects the transceiver as a counterfeit and may not provide any power to the port where the transceiver is located.

Variations on this basic approach may implement the storage of a plurality of different data strings in a plurality of predetermined memory locations as well as the encryption of all or a portion of the data string(s) according to a cryptographic scheme known only to the VAR and the manufacturer. However, the basic technique of FIG. 3 and variations of it suffer from the same problem insofar as data strings—encrypted or otherwise—are often stored in EEPROM or other nonvolatile memory: To overcome the manufacturer's and VAR's anti-counterfeiting measures, a counterfeiter can simply purchase a genuine transceiver and copy the content of its EEPROM or other nonvolatile memory into a counterfeit transceiver. When the counterfeit transceiver is connected to the host, the host finds the copied data string(s) in the predetermined memory location(s) and believes the counterfeit is a genuine device.

Figure 4:
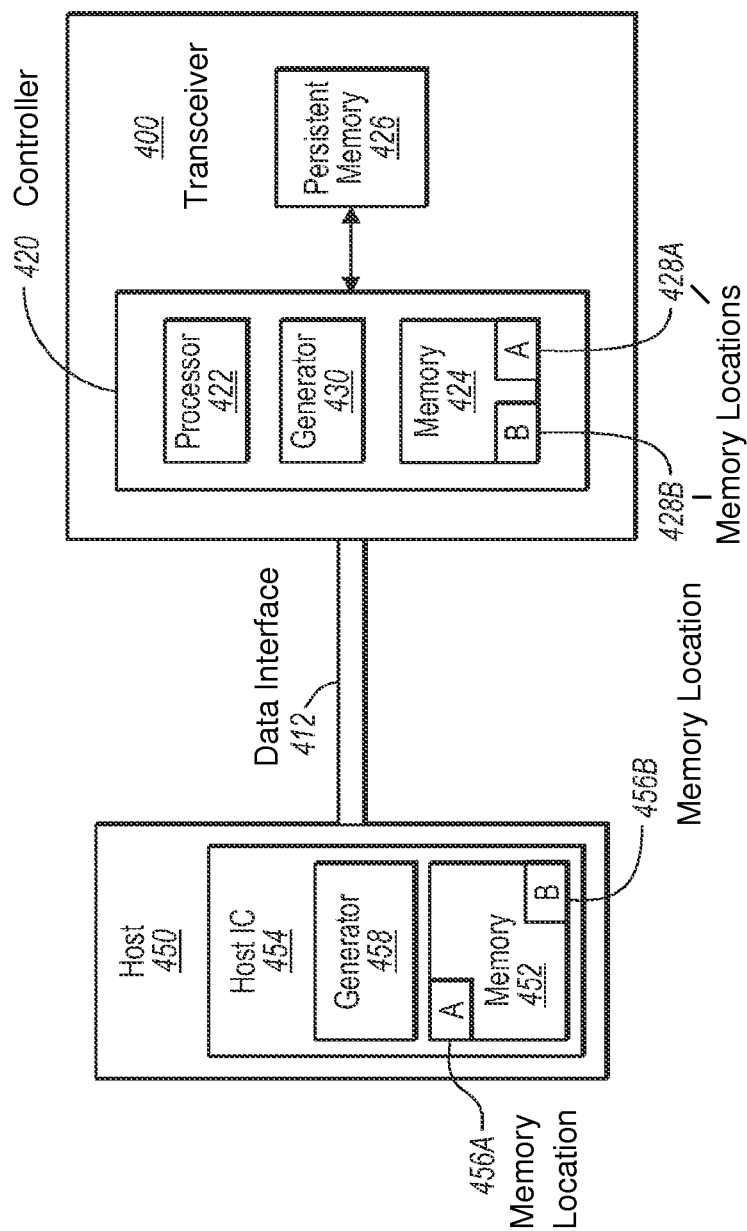
FIG. 4 illustrates an exemplary system which may be used to authenticate a transceiver or other component coupled to a host system.

FIG. 4 depicts one system designed to overcome these and other limitations, and may be implemented in the transceivers of FIGS. 1 and 2, although the principles of the present invention may be implemented in other embodiments as well. Embodiments of the invention can be used to authenticate one device that is connected with another device. In FIG. 4, the first device is a transceiver and the second device is a host system. In this case, the device is thus authenticated in the host system. A host integrated circuit (IC) 454 resides on a host 450 and is programmed with a predetermined encryption or decryption key, or both. In some embodiments, the host IC 454 may additionally include memory 452, having first and second predetermined memory locations, 456A and 456B, and a random or pseudo-random data string generator 458. The generated data strings may be used to authenticate the transceiver module 400.

The host IC 454 communicates with a controller 420 of a transceiver 400 over an interface, MDIO interface, or other suitable data interface 412. The controller 420 includes a processor 422 programmed with a predetermined encryption or decryption key, or both. The controller 420 may additionally include memory 424 having first and second predetermined memory locations, 428A and 428B, and a random or pseudo-random data string generator 430. One or both of the predetermined memory locations 428A and 428B may alternately be located in persistent memory 426.

The controller 420 governs authentication activities within the transceiver 400 using predetermined information. In one embodiment, this governance is implemented by the components described above. Typically, a transceiver manufacturer and VAR establish a prior agreement as to a cryptographic scheme and predetermined memory locations. The agreed-upon cryptographic scheme may comprise a symmetric key algorithm implementing block or stream ciphers, an asymmetric key algorithm implementing public and private keys, other cryptographic algorithms which have been or will be created, and any combination thereof as may be suitable for the purposes of the invention. Although the present discussion distinguishes encryption keys from decryption keys, those of skill in the art will recognize that for some cryptographic schemes (e.g., symmetric key algorithms), the same key may be used to perform both encryption and decryption.

The VAR programs an appropriate key or keys (e.g., encryption key, decryption key) into the host IC 454 and the manufacturer programs a complementary key or keys into the processor 422. For instance, a decryption key that can decrypt an encryption generated with an encryption key is complementary to the encryption key. Similarly, the encryption key is complementary to the decryption key. As will be described more fully below, the processor 422 may be programmed with an encryption key while the host IC 454 is programmed with a decryption key that is complementary to the processor's encryption key, or vice versa. Alternately, the host IC 454 or the processor 422 may be programmed with both keys while the other is programmed with one or both keys.

The transceiver 400 authenticates itself to the host 450 after being plugged into the host. In one embodiment, the host IC 454 generates a random or pseudo-random data string using the data string generator 458 and writes the data string to a first predetermined memory location 428A known to the controller 420. The controller 420 constantly (or periodically or when instructed) checks for the data string from the host system in the first predetermined memory location 428A. When the data string is detected, the processor 422 encrypts the data string using the predetermined encryption key and writes the encrypted data string to a second predetermined memory location 428B known to the host system. As mentioned before, one or both of the first and second predetermined memory locations 428A, 428B may be located in the controller memory 424 or the persistent memory 426. The host system retrieves the encrypted data string from the second predetermined memory location 428B and decrypts the data string using the corresponding decryption key. If the decrypted data string matches the original data string sent to the transceiver, then the host 450 may be assured that the transceiver 400 is a qualified transceiver and not a counterfeit.

In another embodiment, the host IC 454 generates a data string, encrypts it using the predetermined encryption key and writes the encrypted data string to the first predetermined memory location 428A. The controller retrieves the encrypted data string, decrypts it using the corresponding decryption key and writes the decrypted data string to the second predetermined memory location 428B. The host system retrieves the decrypted data string and re-encrypts it using the predetermined encryption key. The host IC compares the originally encrypted data string to the re-encrypted data string and if they match, the transceiver 400 is a qualified transceiver.

In the embodiments just disclosed, the host initiates the authentication process by writing a data string to the first predetermined memory location. In other embodiments, however, the transceiver 400 may initiate the authentication process. For instance, the controller 420 may generate a random or pseudo-random data string using the data string generator 430 and write the data string to a first predetermined memory location 456A known to the host IC 454 in host memory 452. The host IC 454 detects the data string, encrypts it using the predetermined encryption key and writes an encrypted data string to a second predetermined memory location 456B known to the controller. To authenticate the transceiver 400, the controller 422 retrieves the encrypted data string, decrypts it and compares the decrypted data string to the data string originally sent to the host. Alternately, the controller 422 may generate a data string and encrypt it before writing it to the first predetermined memory location 456A. The host IC 454 may decrypt the encrypted data string and write the decrypted data string to the second predetermined memory location 456B. The controller 422 retrieves the decrypted data string, re-encrypts it and compares the originally encrypted data string to the re-encrypted data string to authenticate the transceiver. In the embodiments wherein the transceiver initiates the authentication process, the host IC may be configured to monitor whether the transceiver writes a data string to the first predetermined memory location 456A and retrieves a data string from the second predetermined memory location 456B. If the host IC 454 does not detect either one or both of these operations, the host IC 454 may cut off power to the transceiver 400 or otherwise notify the host of the presence of an unauthenticated transceiver.

More generally, when authenticating one device with another device, embodiments of the invention use the cryptographic keys (e.g., encryption and/or decryption keys) to change the cryptographic state of a data string. One device, for example, changes the cryptographic state from decrypted to encrypted or vice versa. The other device then changes the cryptographic state again. If the resulting data string matches the original data string, then the device is authenticated. The authentication process can use the volatile or nonvolatile memory of either device as described herein.

Figure 5:
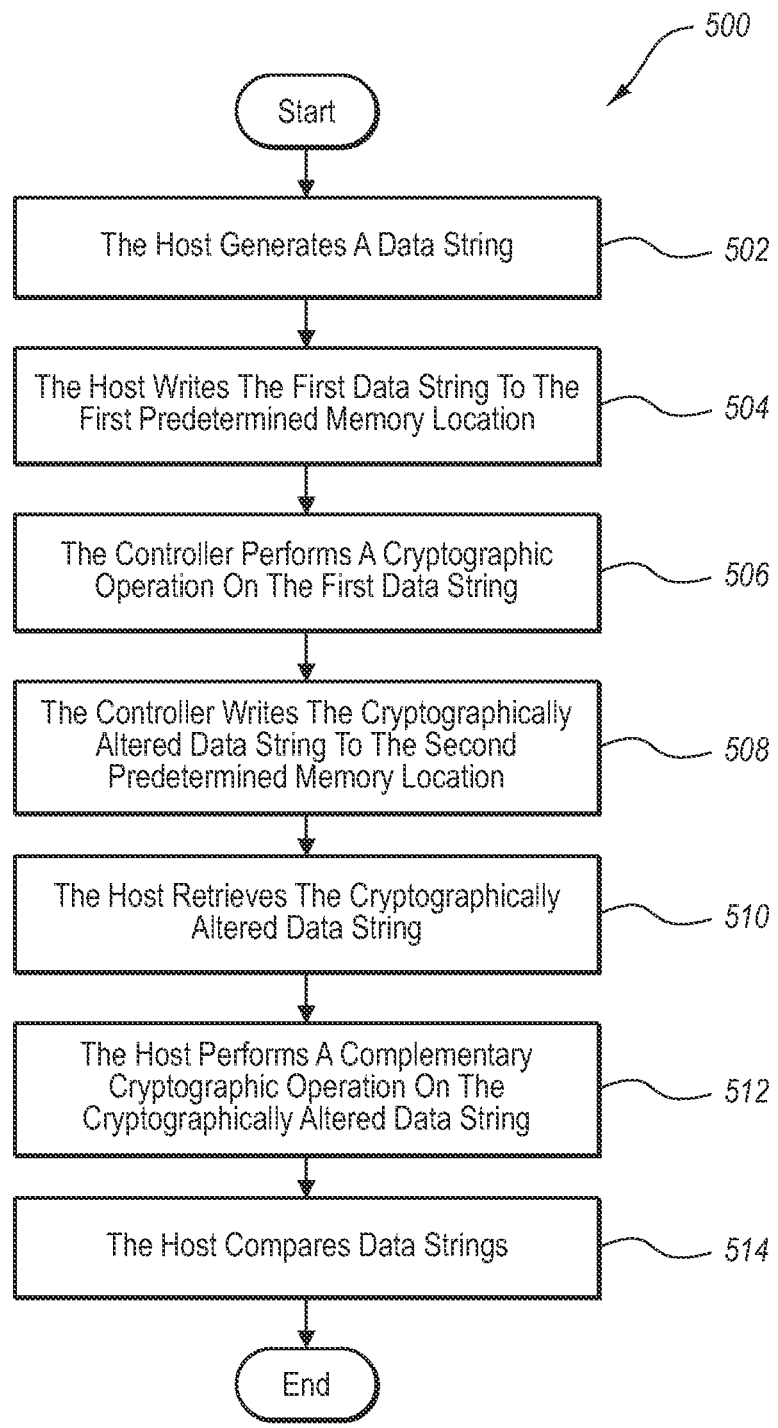
FIG. 5 is a flowchart depicting a host-initiated process for authentication of a transceiver or other component.

With reference now to FIG. 5, a flowchart illustrating an exemplary method 500 for authentication is described. The process begins after the transceiver manufacturer and the VAR agree upon a cryptographic scheme and predetermined memory locations. In the method 500 of FIG. 5, the manufacturer and the VAR have agreed that the predetermined memory locations will be on the transceiver 400, which means the authentication process will be initiated by the host IC 454. According to this embodiment, it is not necessary for the host IC 454 to include first and second predetermined memory locations 456A, 456B or for the controller to include a data string generator 430.

The host IC generates 502 a data string, which the data string may be random or pseudo-random and may be different every time the transceiver is authenticated. With regard to the data string, the host IC and the controller are designed to perform complementary cryptographic operations thereon. As used herein, "complementary cryptographic operations" refer to encryption and decryption operations performed with corresponding encryption and decryption keys. Hence, if the controller is configured to encrypt the data string, the host IC is configured to decrypt the data string, whereas if the host IC encrypts the data string, the controller decrypts the data string. Accordingly, if the controller is programmed to encrypt the data string, the host IC writes 504 an unencrypted version of the data string to a first predetermined memory location in the controller memory known to the controller. However, if the controller is programmed to decrypt the data string, the host IC first encrypts the data string and then writes 504 an encrypted version of it to the first predetermined memory location. The data string written to the first predetermined memory location, whether encrypted or unencrypted, may be referred to hereinafter as the "first data string."

The controller is configured to constantly check for data strings from the host system in order to authenticate the transceiver. Consequently, when the data string is detected, the controller retrieves the data string and performs 506 a cryptographic operation thereon, either decrypting the encrypted version of the data string or encrypting the unencrypted version of the data string, depending on the controller configuration. The controller writes 508 the cryptographically altered data string to a second predetermined memory location in the controller memory known to the host IC.

The host IC retrieves 510 the cryptographically altered data string and performs 512 a complementary cryptographic operation thereon. The host IC compares 514 the resulting data string to the first data string written by the host IC to the first predetermined memory location. By comparing the resulting data string to the first data string, the host may verify that the transceiver 400 is a valid transceiver for use with the host. If the data strings are equal, the host IC may be assured that the transceiver is a qualified transceiver and not a counterfeit. If the data strings do not match or if the host IC does not find a cryptographically altered data string in the second predetermined memory location, this can indicate a problem condition existing with an otherwise valid transceiver, or the presence of a non-authenticated (invalid) transceiver. In either case, corrective or appropriate action can be taken by the host IC, including deactivation of the transceiver, the sending of an alert, etc.

The method 500 of FIG. 5 may be implemented in various embodiments. For instance, in one embodiment, the controller is configured to decrypt data strings. In this embodiment, the host IC generates 502 a random or pseudo-random data string, encrypts it and writes 504 the encrypted data string to the first predetermined memory location. The controller decrypts 506 the encrypted data string and writes 508 the decrypted data string to the second predetermined memory location. The host IC retrieves 510 the decrypted data string from the second predetermined memory location, encrypts 512 the decrypted data string and compares 514 the re-encrypted data string to the encrypted data string originally written to the first predetermined memory location. If the re-encrypted data string and the original encrypted data string match, the transceiver is authenticated.

In another embodiment, the controller is configured to encrypt data strings. In this embodiment, the host IC generates 502 a random or pseudo-random data string and writes 504 the data string to the first predetermined memory location. The controller encrypts 506 the data string and writes 508 the encrypted data string to the second predetermined memory location. The host IC retrieves 510 the encrypted data string from the second predetermined memory location, decrypts 512 the encrypted data string and compares 514 the decrypted data string to the data string originally written to the first predetermined memory location. If the decrypted data string and the original data string match, the transceiver is authenticated.

Figure 6:
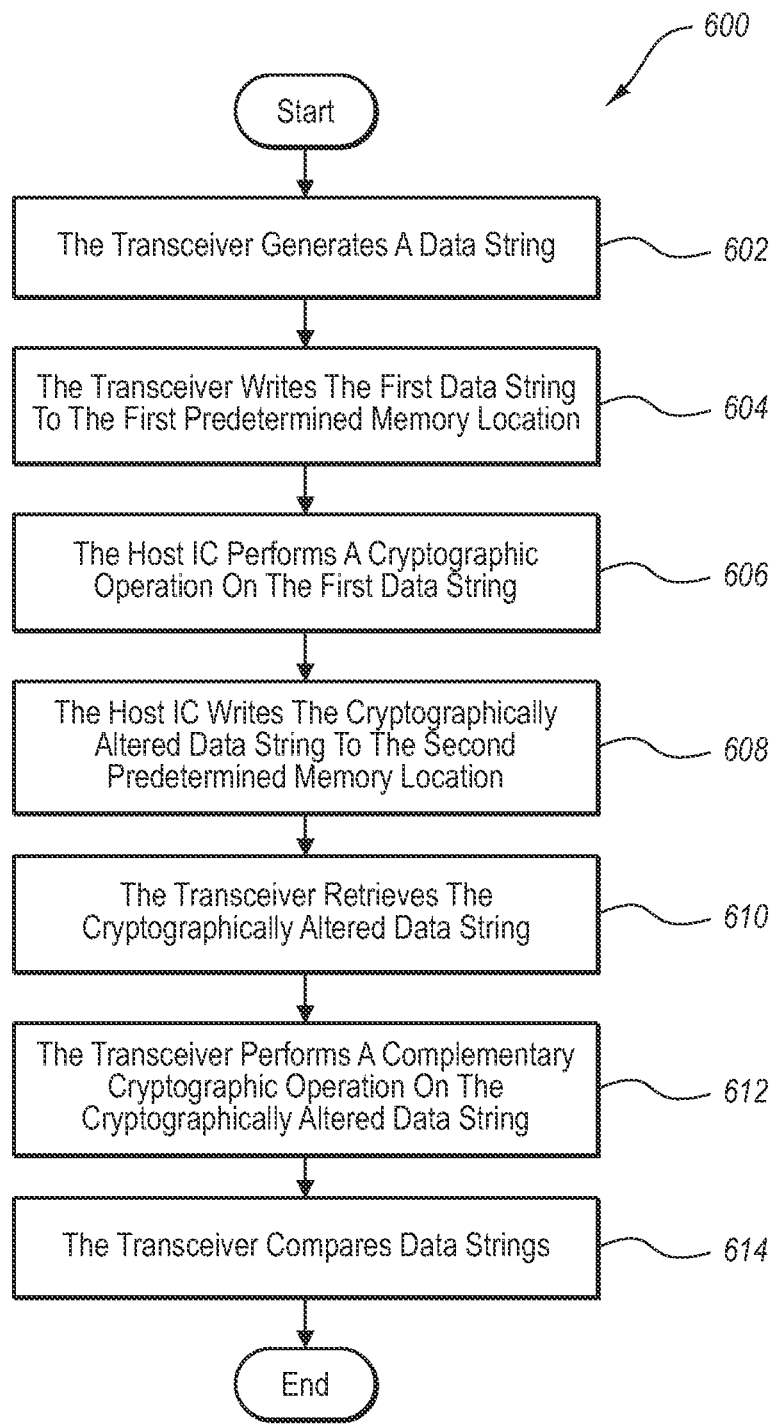
FIG. 6 is a flowchart illustrating a transceiver/component-initiated process for authentication of a transceiver or other component.

FIG. 6 is a flowchart illustrating another exemplary method 600 for authentication. As with the method 500 of FIG. 5, the process may begin after a transceiver manufacturer and a VAR agree upon an encryption scheme and predetermined memory locations. In the method 600 of FIG. 6, the manufacturer and the VAR have agreed that the predetermined memory locations will be on the host 450, which means the authentication process will be initiated by the controller 420. According to this embodiment, it is not necessary for the controller 420 to include first and second predetermined memory locations 428A, 428B or for the host IC 454 to include a data string generator 458.

Using the data string generator, the transceiver generates 602 a random or pseudo-random data string and writes 604 a version of the data string to a first predetermined memory location in the host memory known to the host IC. Depending on whether the host IC is programmed to decrypt or encrypt data strings, the controller may write an encrypted or unencrypted version of the data string to the first predetermined memory location. As in FIG. 5, the data string written to the first predetermined memory location, whether encrypted or unencrypted, may be referred to hereinafter as the "first data string."

The host IC is configured to constantly check for data strings from the transceiver in order to authenticate the transceiver. Consequently, when the data string is detected, the host IC performs 606 a cryptographic operation on the data string, either decrypting an encrypted version of the data string or encrypting an unencrypted version of the data string. The host IC writes 608 the cryptographically altered data string to a second predetermined memory location in the host memory known to the controller.

The transceiver retrieves 610 the cryptographically altered data string and performs 612 a complementary cryptographic operation thereon. The transceiver compares 614 the resulting data string to the data string originally written by the transceiver to the first predetermined memory location. If the data strings match, the transceiver is a qualified transceiver. If the data strings do not match, the transceiver automatically shuts itself down.

This functionality may be desirable where one VAR uses different transceivers (A and X) in different host systems (B and Y) created by the VAR. The VAR and the transceiver manufacturer can agree beforehand that transceiver A is only to be used in host system B and transceiver X is only to be used in host system Y. In this case, transceiver A and host system B would be programmed with one complementary set of encryption/decryption keys while transceiver X and host system Y would be programmed with a different complementary set of encryption/decryption keys. If transceiver A is coupled to host system Y, or transceiver X is coupled to host system B, neither transceiver will authenticate itself since the cryptographic key of transceiver A is not complementary to the cryptographic key of host system Y and the cryptographic key of transceiver X is not complementary to the cryptographic key of host system B. Therefore, the transceivers may automatically disqualify themselves from functioning when not utilized as agreed upon by the manufacturer and the VAR.

Additionally, the host IC may be configured to qualify the transceiver according to the method 600 of FIG. 6. If the host IC is coupled to a transceiver and the transceiver does not write a data string to the first predetermined memory location, this may indicate to the host IC a problem condition existing with an otherwise valid transceiver, or the presence of a non-authenticated (invalid) transceiver. In either case, corrective or appropriate action can be taken by the host, including deactivation of the transceiver, the sending of an alert, etc.

The method 600 of FIG. 6 may be implemented in various embodiments. For instance, in one embodiment, the host IC is configured to decrypt data strings. In this embodiment, the transceiver generates 602 a data string, encrypts it and writes 604 the encrypted data string to the first predetermined memory location. The host IC decrypts 606 the encrypted data string and writes 608 the decrypted data string to the second predetermined memory location. The transceiver retrieves 610 the decrypted data string from the second predetermined memory location, encrypts 612 the decrypted data string and compares 614 the re-encrypted data string to the encrypted data string originally written to the first predetermined memory location. If the re-encrypted data string and the original encrypted data string match, the transceiver is authenticated.

In another embodiment, the host IC is configured to encrypt data strings. In this embodiment, the transceiver generates 602 a data string and writes 604 the data string to the first predetermined memory location. The host IC encrypts 606 the data string and writes 608 the encrypted data string to the second predetermined memory location. The transceiver retrieves 610 the encrypted data string from the second predetermined memory location, decrypts 612 the encrypted data string and compares 614 the decrypted data string to the data string originally written to the first predetermined memory location. If the decrypted data string and the original data string match, the transceiver is authenticated.

While some of the embodiments disclosed herein use a memory-mapped device interface and predetermined memory locations, other embodiments of the invention may be implemented without predetermined memory locations. Returning to the system of FIG. 4, a method of authenticating a device will be described that does not use predetermined memory locations. Instead, this embodiment may implement a command-based device interface. According to this embodiment, the VAR and device manufacturer agree beforehand upon a cryptographic scheme and identical cryptographic keys are programmed into the host 450 and device 400. In a typical embodiment, the identical cryptographic keys are encryption keys.

In operation, the generator 458 of the host 450 generates a random or pseudo-random data string. Whereas the data string is used by both the device 400 and the host 450, the data string can be created in duplicate and/or a copy of the data string can be generated. Accordingly, a first data string is provided to the device 400 and a second data string identical to the first data string is retained by the host 450. The first data string may be provided by the host 450 to the device 400 using a command-based device interface, for example.

The host 450 uses its encryption key to encrypt the second data string, thereby generating a host-encrypted data string. Similarly, the device 400, after receiving the first data string, uses its encryption key to encrypt the first data string, thereby generating a device-encrypted data string. The device 400 then provides the device-encrypted data string to the host 450.

The host 450 receives the device-encrypted data string and compares it with the host-encrypted data string. If the device-encrypted data string and the host-encrypted data string are identical, the device is authenticated and is identified as an authorized device. Otherwise, the host may take corrective action as already described. While the present embodiment has been described in the context of the host 450 generating and providing the data string to the device 400, in other embodiments the host and device can switch roles with the device generating and providing the data string to the host, and so on.

According to the present embodiment of the invention, the VAR and manufacturer need not agree beforehand on predetermined memory locations for depositing and retrieving data strings. Indeed, when the host or device provides a data string to the other (i.e., the recipient), the host or device can simply transmit the data string to the recipient and let the recipient determine where to store the data string while processing it, and so forth.

Advantageously, embodiments of the present invention enable transceivers, such as those from a preferred source, to be authenticated while preventing counterfeiters from easily circumventing the anti-counterfeiting measures of the prior art (e.g., FIG. 3) simply by copying the EEPROM from an authentic transceiver into a counterfeit transceiver. According to the present invention, a transceiver may be authenticated every time a host system is turned on. Copying the EEPROM or other memory of an authentic transceiver is ineffective for counterfeit manufacturers since the data strings written to the EEPROM or other memory of the transceiver may be different during every authentication session and must be either encrypted or decrypted by the transceiver. Additionally, the encryption/decryption keys are programmed into the controller and host IC and are to code. As such, counterfeit manufacturers are unable to easily discover the exact encryption/decryption keys which would be needed to produce a viable copycat transceiver. Further, in the event encryption/decryption keys were discovered by a counterfeit manufacturer, the authentic manufacturer and the VAR could simply agree upon a new set of encryption/decryption keys. Finally, the manufacturer may use a different set of encryption/decryption keys with each product and with each VAR.

Embodiments within the scope of the present invention include computer-readable media for carrying or having computer-executable instructions or electronic content structures stored thereon, and these terms are defined to extend to any such media or instructions that are used with transceiver modules. By way of example, and not limitation, such computer-readable media can comprise RAM, ROM, EEPROM, CD-ROM or other optical disk storage, magnetic disk storage or other magnetic storage devices, or any other medium which can be used to carry or store desired program codes in the form of computer-executable instructions or electronic content structures and which can be accessed by a general purpose or special purpose computer, or other computing device.

When information is transferred or provided over a network or another communications connection (such as an I$^2$C interface between a host and a transceiver) to a computer or computing device, the computer or computing device properly views the connection as a computer-readable medium. Thus any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Compute-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more non-transitory computer readable media having encoded thereon computer-executable instructions which, when executed by one or more computers, cause the one or more computers to perform the following acts:

generating, by a host device, a first data string, wherein the first data string differs each time the first data string is generated and has a first cryptographic state generated using a first cryptographic key programmed into the host device by a first manufacturer;

writing, by the host device, the first data string having the first cryptographic state to a first predetermined memory location on an optical transceiver;

accessing a second predetermined memory location on the optical transceiver, wherein the first and the second predetermined memory locations are known and accessible to the host device such that the host device can write to and retrieve data from the first and the second predetermined memory locations;

detecting, by the host device, whether the first data string having a second cryptographic state is in the second predetermined memory location, wherein the first cryptographic state of the first data string has been changed to the second cryptographic state using a second cryptographic key programmed to the optical transceiver by a second manufacturer and the first and second predetermined memory locations are agreed upon by the first and second manufactures;

in response to not detecting the first data string having the second cryptographic state in the second predetermined memory location, deactivating the optical transceiver; and in response to detecting the first data string having the second cryptographic state in the second predetermined memory location:

retrieving, by the host device, the first data string having the second cryptographic state from the second predetermined memory location;

changing the second cryptographic state of the first data string to a third cryptographic state using the first cryptographic key;

determining whether the first cryptographic state of the first data string is identical to the third cryptographic state of the first data string; and in response to determining that the first cryptographic state of the first data string is identical to the third cryptographic state of the first data string, authorizing the optical transceiver for operational use with the host device.

2. The one or more non-transitory computer readable media of claim 1, wherein the acts further comprise in response to determining that the first cryptographic state of the first data string is not identical to the third cryptographic state of the first data string, taking corrective action.

3. The one or more non-transitory computer readable media of claim 2, wherein the taking corrective action comprises one or more of: sending an alert and withholding electrical power from the optical transceiver.

4. The one or more non-transitory computer readable media of claim 1, wherein the first cryptographic key comprises one of: a block cipher key, a stream cipher key, a public key, or a private key.

5. The one or more non-transitory computer readable media of claim 1, wherein the first and third cryptographic states are encrypted states and the second cryptographic state is a decrypted state or wherein the second cryptographic state is an encrypted state and the first and third cryptographic states are decrypted states.

6. One or more non-transitory computer readable media having encoded thereon computer-executable instructions which, when executed by one or more computers, cause the one or more computers to perform the following acts:

receiving a data string in a first predetermined memory location, wherein the data string has a first cryptographic state generated by using a first cryptographic key that is programmed by a first manufacturer;

in response to not detecting the data string having the first cryptographic state in the first predetermined memory location, deactivating an optical transceiver;

in response to detecting the data string having the first cryptographic state in the first predetermined memory location, changing the first cryptographic state of the data string to a second cryptographic state with a second cryptographic key that is programmed by a second manufacturer;

writing the data string having the second cryptographic state to a second predetermined memory location, wherein the first and the second predetermined memory locations exist in persistent memory of the optical transceiver or a host device and are known and accessible to the other of the optical transceiver or the host device such that the optical transceiver or the host device can write to and retrieve data from the first and second predetermined memory locations and the first and second predetermined memory locations are agreed upon by the first and second manufactures;

retrieving the data string having the second cryptographic state from the second predetermined memory location;

changing the second cryptographic state of the data string retrieved from the second predetermined memory location to a third cryptographic state using the first cryptographic key;

determining whether the third cryptographic state of the data string is identical to the first cryptographic state of the data string; and in response to determining that the third cryptographic state of the data string is identical to the first cryptographic state of the data string, permitting the optical transceiver to be operationally used with the host device, wherein the second cryptographic key is complementary to the first cryptographic key if the first and the second manufacturers agree to permit the optical transceiver to be operationally used with the host device or the second cryptographic key is non-complementary to the first cryptographic key if the first and the second manufacturers do not agree to permit the optical transceiver to be operationally used with the host device.

7. The one or more non-transitory computer readable media of claim 6, wherein one of:
the first cryptographic key is an encryption key and the second cryptographic key is a decryption key; or
the first cryptographic key is a decryption key and the second cryptographic key is an encryption key.

8. The one or more non-transitory computer readable media of claim 6, wherein the data string is different each time authenticity of the optical transceiver is determined.

9. The one or more non-transitory computer readable media of claim 6, wherein one of:
the first cryptographic state is an encrypted state and the second cryptographic state is a decrypted state; and
the first cryptographic state is an unencrypted state and the second cryptographic state is an encrypted state.

10. The one or more non-transitory computer readable media of claim 6, wherein the data string is generated using a pseudo-random data string generator.

11. The one or more non-transitory computer readable media of claim 6, wherein the acts further comprise in response determining that the third cryptographic state of the data string is not identical to first cryptographic state of the data string, taking corrective action.

12. The one or more non-transitory computer readable media of claim 11, wherein the taking corrective action comprises one or more of: sending an alert and withholding electrical power from the optical transceiver.

13. The one or more non-transitory computer readable media of claim 6, wherein the encryption key comprises one of: a block cipher key or a stream cipher key.

* * * * *